US007180343B2

United States Patent
Shin et al.

(10) Patent No.: US 7,180,343 B2
(45) Date of Patent: Feb. 20, 2007

(54) APPARATUS FOR SYNCHRONIZING CLOCK USING SOURCE SYNCHRONOUS CLOCK IN OPTICAL TRANSMISSION SYSTEM

(75) Inventors: Jong-Yoon Shin, Gyeonggi-do (KR); Je-Soo Ko, Daejon (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 11/223,277

(22) Filed: Sep. 9, 2005

(65) Prior Publication Data
US 2006/0133816 A1 Jun. 22, 2006

(30) Foreign Application Priority Data
Dec. 16, 2004 (KR) ............. 10-2004-0107257

(51) Int. Cl.
 *H03L 7/00* (2006.01)
(52) U.S. Cl. ................... 327/141; 327/147
(58) Field of Classification Search ........... 327/141, 327/147, 154, 155, 156, 162, 163; 331/14, 331/17, 25, DIG. 2; 375/373–376
See application file for complete search history.

(56) References Cited

U.S. PATENT DOCUMENTS 6,452,421 B2 9/2002 Saito ..................... 326/93
6,631,144 B1* 10/2003 Johansen ............... 370/516

FOREIGN PATENT DOCUMENTS

KR 1998-033965 8/1998

* cited by examiner

*Primary Examiner*—Linh My Nguyen
(74) *Attorney, Agent, or Firm*—Blakely Sokoloff Taylor & Zafman

(57) ABSTRACT

An apparatus for synchronizing a clock using a source synchronous clock is disclosed. The apparatus includes: channel receivers for receiving a source synchronous channel; divider for dividing the source synchronous clock to a low frequency clock; selectors for selecting one of the divided source synchronous clock and a system clock as a reference clock; detectors for generating a phase difference signal; phase difference signal selectors for selecting a phase difference signal from the detectors and a phase difference signal from an internal logic; and voltage oscillators for transmitting a clock synchronized to a source synchronous channel to the external optical transmission system by generating a predetermined synchronous frequency according to the selected phase difference signal.

7 Claims, 4 Drawing Sheets

APPARATUS FOR SYNCHRONIZING CLOCK USING SOURCE SYNCHRONOUS CLOCK IN OPTICAL TRANSMISSION SYSTEM

FIELD OF THE INVENTION

The present invention relates to a clock synchronizing apparatus of an optical transmission system; and, more particularly, to a clock synchronizing apparatus for synchronizing a clock using a source synchronous clock of a source synchronous channel transmitted from an external device, and dynamically changing a clock synchronous source to change a synchronous reference clock according to a state of the clock synchronizing apparatus.

DESCRIPTION OF THE PRIOR ART

FIG. 1 is a block diagram illustrating a digital transmission system using a source synchronous channel in accordance with the prior art.

The digital transmission system uses a source synchronous channel in order to securely transfer high-speed data to other system. When transmitting the data, a system clock is used as a reference clock to synchronize functional blocks in the digital transmission system.

As shown in FIG. 1, the digital transmission system includes a channel transmitting unit 10, a channel receiving unit 20, and a plurality of data transmission lines (DATA 1 to DATA N).

The channel transmitting unit 10 is a logic circuit form transmitting a signal, and the channel receiving unit 20 is a logic circuit form receiving a signal. Such a circuit is an integrated circuit. The data transmission lines (DATA 1 to DATA N) are formed between the channel transmitting unit 10 and the receiving unit 20 on a circuit board for transferring data signal from the transmitting unit 10 to the receiving unit 20.

The channel transmitting unit 10 transmits a source synchronous clock (DCK) with a plurality of data signals (DATA). The channel transmitting unit 10 includes a flip flop 11, a driver 12, a receiver 13, and a source synchronous generator 14. The flip flop 11 receives data signal from other sub-unit of the channel transmitting unit 10, and transmits the data signal by being synchronized at a system clock signal (SACK) from a system clock generator 40. The driver 12 supplies power to a signal to transmit the signal through the data transmission lines (DATA 1 to DATA N). Generally, a differential signal is used for data signal transmission faster than 200 MHz. The receiver 13 receives a system clock from the system clock generator 40, and transfers the received system clock to the flip flop 11 and the source synchronous generator 14. The source synchronous generator 14 generates a source synchronous clock (DCK) by receiving the system clock from the receiver 13.

The receiving unit 20 includes a receiver 21, a flip flop 22, a clock distributor 23, a variable delay circuit 24, a phase comparator and a flip flop 26. The receiver 21 receives the data signal transmitted from the driver 12 and transfers the data signal to inside the integrated circuit. The flip flop 22 receives data signal by being synchronized with a source synchronous clock signal (DCK).

Data signals (DATA 1 to DATA N) are transmitted from the transmitting unit's flip flop 11 to the receiving unit's flip flop 22 through the driver 12, the data transmission line 30, the receiver 21.

The source synchronous clock signal (DCK) generated by the source synchronous clock generator 14 is transferred to the receiving unit 20 through the driver 12 and the data transmission line 30. Herein, a line for transferring the source clock should be same as the data transmission line. Also, the source synchronous clock signal (DCK) is transferred to the receiving unit's flip flop 22 as a clock through the receiver 21 and the clock distributor 23.

The variable delay circuit 24 adjusts delay of data signal received by the flip flop 22. The phase comparator 25 generates a control signal for controlling delay amount of the variable delay circuit 24 by detecting a phase difference between the source synchronous clock signal (DCK) and the system clock signal.

The delay of the data signal is adjusted by the variable delay circuit 24. The flip flop 26 receives the adjusted data signal at next system clock (SACK), and transfers the adjusted data signal to other logic circuit.

As described above, in the conventional digital transmission system, one system clock is used to synchronize the channel transmitting unit 10 and the receiving unit 20, and the source synchronous clock is used to receive the source synchronous channel data.

An optical transmission system converts high-speed optical signal to an electric signal to be low-bit parallel signal. The source synchronous channel is used in the optical transmission system to transfer the electric signals to other units.

However, fine phase and frequency differences are generated between a recovered clock based on data transmitted through an optical line and a system clock. Therefore, data and clock cannot be received through the optical line by controlling only a phase based on a system clock in the optical transmission system.

In case of driving an apparatus using a fixed system clock, a justification circuit is additionally required to dynamically synchronize a variable restored clock to a system clock because an input clock is varied according to characteristics of the optical transmission line. Also, complex structure is required for transferring a signal in a transmitting direction or reverse direction by using a system clock as a reference clock in the conventional optical transmission system.

SUMMARY OF THE INVENTION

It is, therefore, an object of the present invention to provide a clock synchronizing apparatus using a source synchronous clock for synchronizing a clock by using a source synchronous clock of a source synchronous channel inputted from an external device without using additional system clock, and dynamically changing a clock synchronous source to change a reference clock according to a state of the clock synchronizing apparatus.

In accordance with one aspect of the present invention, there is provided an apparatus for synchronizing a clock using a source synchronous clock in an optical transmission system, the apparatus including: a first and a second source synchronous channel receiving unit for receiving a source synchronous channel inputted from an external device; a first and a second clock dividing unit for dividing the source synchronous clock received from the first and the second source synchronous channel receiving unit to a low frequency clock to be used to synchronize a clock; a first and a second reference clock selecting unit for selecting one of the divided source synchronous clock from the first-clock dividing unit, the divided source synchronous clock from the second clock dividing unit and a system clock as a reference clock; a first and a second phase detecting unit for receiving the reference clock from the first and the second reference clock selecting unit, receiving a supplementary clock from a third and a fourth clock dividing unit, wherein the supplementary clock is generated at the third and the fourth clock dividing unit by receiving a returned clock (TXSRCCLK) received from an external optical transmission system and dividing the returned clock, comparing the reference clock and the supplementary clock, and generating a phase difference signal according to the comparison result; a first and a second phase difference signal selecting unit for selecting a phase difference signal from the first and the second phase detecting unit and a phase difference signal generated by comparing a phase in an internal logic; and a first and a second voltage oscillating unit for generating a predetermined synchronous frequency according to the selected phase difference signal, and transmitting a clock synchronized to a source synchronous channel to the external optical transmission system.

In accordance with another aspect of the present invention, there is provided an apparatus for synchronizing a clock using a source synchronous clock in an optical transmission system, the apparatus including: a first and a second source synchronous channel receiving unit for receiving a source synchronous channel inputted from an external device; a first and a second clock dividing unit for dividing the source synchronous clock received from the first and the second source synchronous channel receiving unit to a low frequency clock to be used to synchronize a clock; a phase detecting unit having a plurality of phase detectors for generating a phase difference signal by comparing each of two source synchronous clocks received from the first and the second clock dividing unit to a system clock; a first and a second phase difference signal selecting unit for selecting a phase difference signal from each of the phase detectors and a phase difference signal from an internal logic by comparing a phase; and a first and a second voltage oscillating unit for transmitting a clock synchronized to a source synchronous channel to the external optical transmission system by generating a predetermined synchronous frequency according to the selected phase difference signal.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings.

Figure 2:
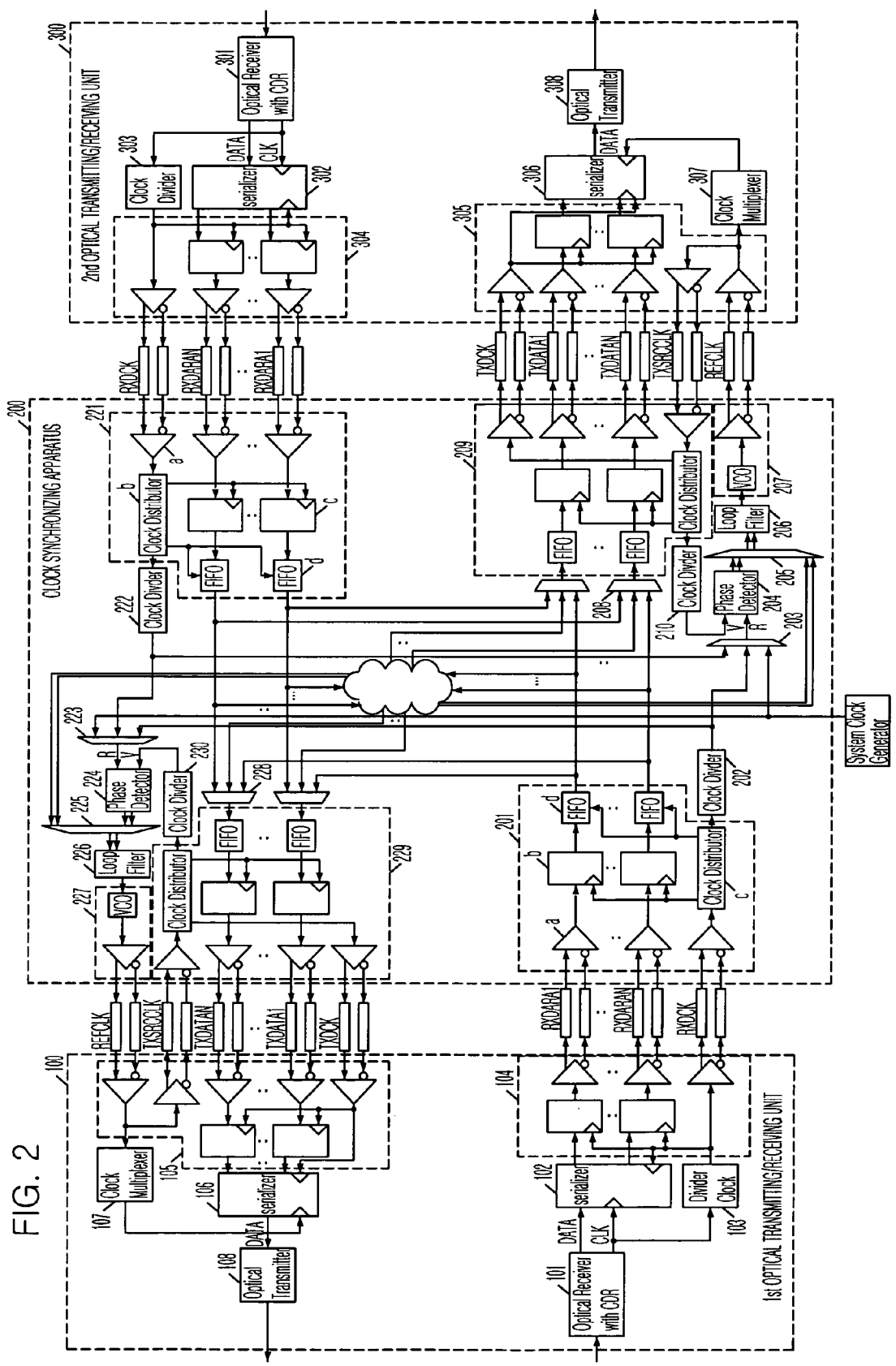
FIG. 2 is a block diagram illustrating an apparatus for synchronizing a clock using a source synchronous clock in an optical transmission system in accordance with a first embodiment of the present invention.

FIG. 2 is a block diagram illustrating an apparatus for synchronizing a clock using a source synchronous clock in an optical transmission system in accordance with a first embodiment of the present invention.

As shown in FIG. 2, the clock synchronizing apparatus 200 cooperates with a first optical transmission system 100 and a second optical transmission system 300.

The first and the second optical transmission system 100 and 300 includes: an optical receiver 101 or 301 for receiving an optical signal; a deserializer 102 or 302 for converting a high-speed serial signal to a parallel signal; a clock divider 103 or 303 for providing a clock to convert high-speed serial signal to the parallel data signal; a source synchronous channel transmitter 104 or 304 configured with a flip flop and a driver for transmitting a source synchronous channel; a source synchronous channel receiver 105 or 305 including a receiver and a flip flop for receiving the source synchronous channel; a serializer 106 or 306 for converting a parallel signal to a serial signal; a clock multiplier 107 or 307 for generating a clock of a high-speed serial signal; and a photoelectric transducer 108 or 308 for transforming an electric signal to an optical signal.

The clock synchronizing apparatus 200 includes a first and a second source synchronous channel receiver 201 and 221; a first and a second source synchronous channel transmitter 209 and 229; a first and a second clock divider 202, 222; a first and a second phase detector 204 and 224; a first and a second reference clock selector 203 and 223; a first and a second phase difference signal selector 205 and 225; a first and a second loop filter 206, 226; a first and a second voltage control oscillator (VCO) 207 and 227; and a first and a second data path selector 208 and 228.

Hereinafter, operations of the clock synchronizing apparatus 200 according to the present embodiment will be explained.

The first and the second source synchronous channel receiver 201 and 221 receives a source synchronous channel from an external device by using a receiver (a), a clock distributor (b), a flip flop (c) and a FIFO (d).

The first and the second clock divider 202 and 222 divides the source synchronous clock inputted from the first and the second source synchronous channel receiver 201 and 221 to a low-frequency clock in order to use the source synchronous clock for synchronizing a clock, and transmits the divided source synchronous clock to the first and the second reference clock selector 203 and 223.

The first and the second reference clock selector 203 and 223 selects a reference clock among the divided source synchronous clock from the first clock divider 202, the divided source synchronous clock from the second clock divider 222 and a system clock, and transmits the selected reference clock to the first and the second phase detector 204 and 224.

The first and the second phase detector 204 and 224 compares the selected reference clock from the first and the second reference clock selector 203 and 223 to a divided clock at the third and the fourth clock divider 210 and 230, and transmits the phase difference to the first and the second phase difference selector 205 and 225 as a pulse sequence signal. Herein, the third and the fourth clock divider 210 and 230 receives a clock (TXSRCCLK) from the first or the second optical transmission system 100 or 300, and divides the received clock to generate the divided clock.

The first and the second phase difference selector 205 and 225 selects a phase difference signal from each of the phase detectors 204 and 224 and a phase difference signal generated from an internal logic by comparing phases, and transmits the selected phase difference signal to the first and the second loop filter 206 and 226.

The first and the second loop filter 206 and 226 eliminates various noises and dynamically changes a voltage of the first and the second voltage controlling oscillator (VCO) 207 and 227.

The first and the second VCO 207 and 227 generates a predetermined synchronous frequency according to input voltage from the corresponding loop filter 206 or 226, and transmits a synchronized clock to a source synchronous channel to each of the first and the second optical transmission system 100 and 300.

The first and the second data path selector 208 and 228 selects synchronous channel data from the first and the second source synchronous channel receiver 201 and 221 and data from other internal logic circuits, and outputs the selected data to external optical transmission apparatus through the source synchronous channel transmitter 209 or 229.

As described above, the clock synchronizing apparatus according to the first embodiment synchronizes a clock without using own system clock by selecting the source synchronous clock as the reference clock and inputting the synchronized clock directly to the optical transmission system. Also, the clock synchronizing apparatus according to the first embodiment can adjust a clock synchronizing according a data path by using the data path selectors 208 and 228 and the reference clock selectors 203 and 223. Accordingly, the clock synchronizing apparatus according to the first embodiment can perform a loop-back and a pass-through function, and can be used as a 1:2 data buffer, 2×2 switch, and a 3R repeater.

Figure 3:
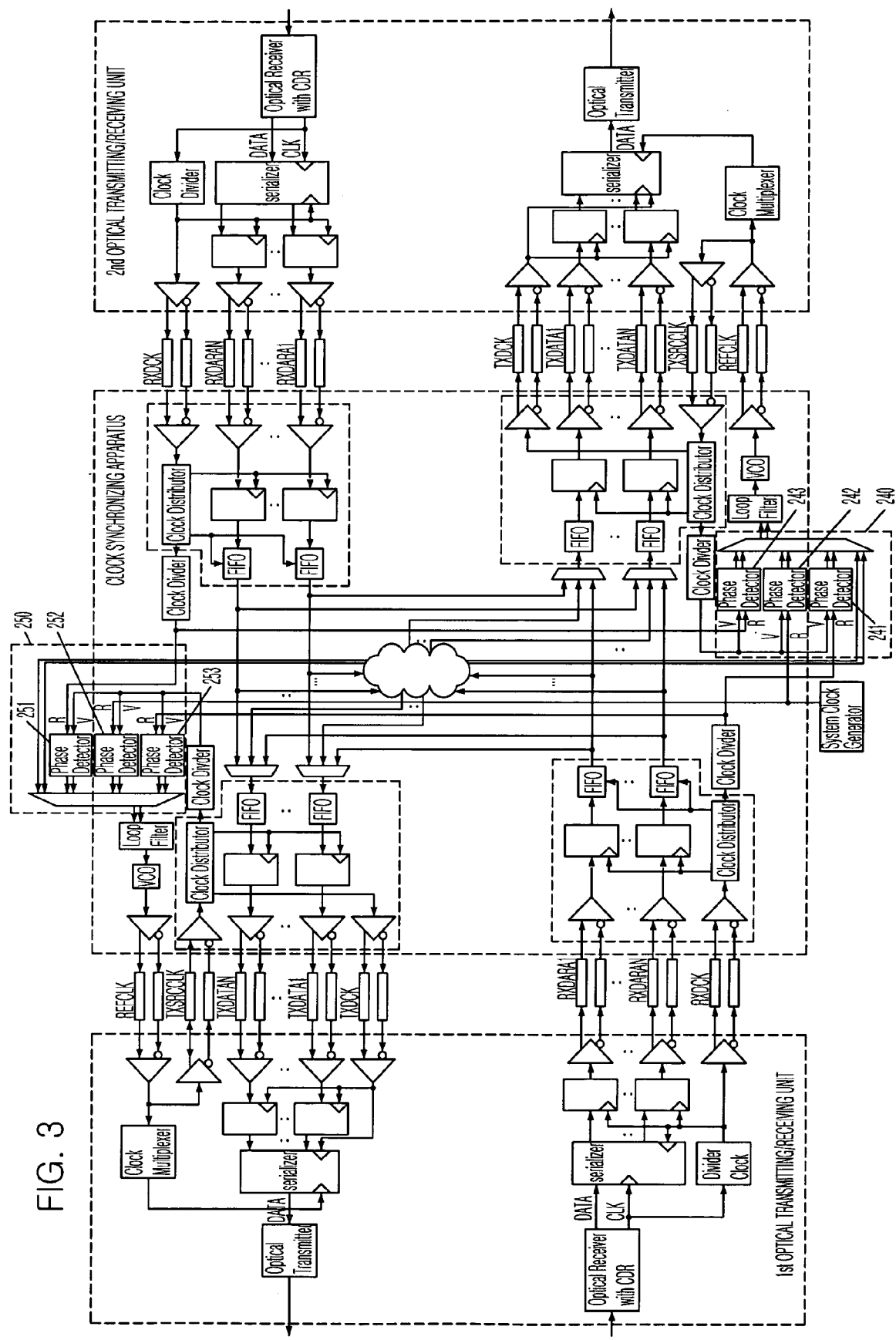
FIG. 3 is a block diagram showing an apparatus for synchronizing a clock using a source synchronous clock in an optical transmission system in accordance with a second embodiment of the present invention.

FIG. 3 is a block diagram showing an apparatus for synchronizing a clock using a source synchronous clock in an optical transmission system in accordance with a second embodiment of the present invention.

As shown in FIG. 3, the clock synchronizing apparatus 200 according to the second embodiment is identical to the clock synchronizing apparatus according to the first embodiment shown in FIG. 2 excepting the reference clock selector.

The clock synchronizing apparatus 200 according to the second embodiment includes a first, a second, a third, a fourth, a fifth, and a sixth phase detector 241 to 243 and 251 to 253 instead of the reference clock selectors.

The phase detectors 241, 242, 243, 251, 252 and 253 do not compare a reference clock and a changed clock. If a high-speed reference clock is inputted through a reference clock selector, noises may be significant or performance may be degraded.

Accordingly, the clock synchronizing apparatus according to the second embodiment uses the phase detectors 241, 242, 423, 251, 252 and 253 for each reference clock in order to directly compare phase difference between the reference clock and the converted clock. Since the phase detectors 241, 242, 243, 251, 252 and 253 outputs a pulse sequence as a phase difference between two clocks, a comparatively low frequency is formed when two clocks are synchronized. Therefore, to select a signal after the phase detectors may give better result than to select a signal before the phase detectors.

The first and the fourth phase detector 241 and 251 compares a source synchronous clock (RXDCK) and the variable clock (TXSRCLK), wherein the source synchronous clock (RXDCK) is received from the second and the first source synchronous channel receiver 221 and 201, that is, the clock dividers 222, 202, respectively. The second and the fifth phase detector 242 and 252 compare the system clock and the reference clock in phase. The third and the sixth phase detector 243 and 252 compare a source synchronous clock and a variable clock, wherein the source synchronous clock is received from the first and the second source clock synchronous channel receiver 201 and 221, that is, the clock dividers 202 and 222, respectively, and transmits the phase difference as the result of comparison to the phase difference signal selector 205 or 225.

The first phase difference signal selector 205 selects phase difference signals received from the first, the second, the third phase detector 241, 242 and 243 and a phase difference signal received from an internal logic by comparing phases, and transmits the selected signal to the first loop filter 206.

The second phase difference signal selector 225 selects phase difference signals receives from the fourth, the fifth, and the sixth phase detector 251, 252 and 253 and a phase difference signal received from an internal logic, and transmits the selected signal to the second loop filter 226.

Figure 1:
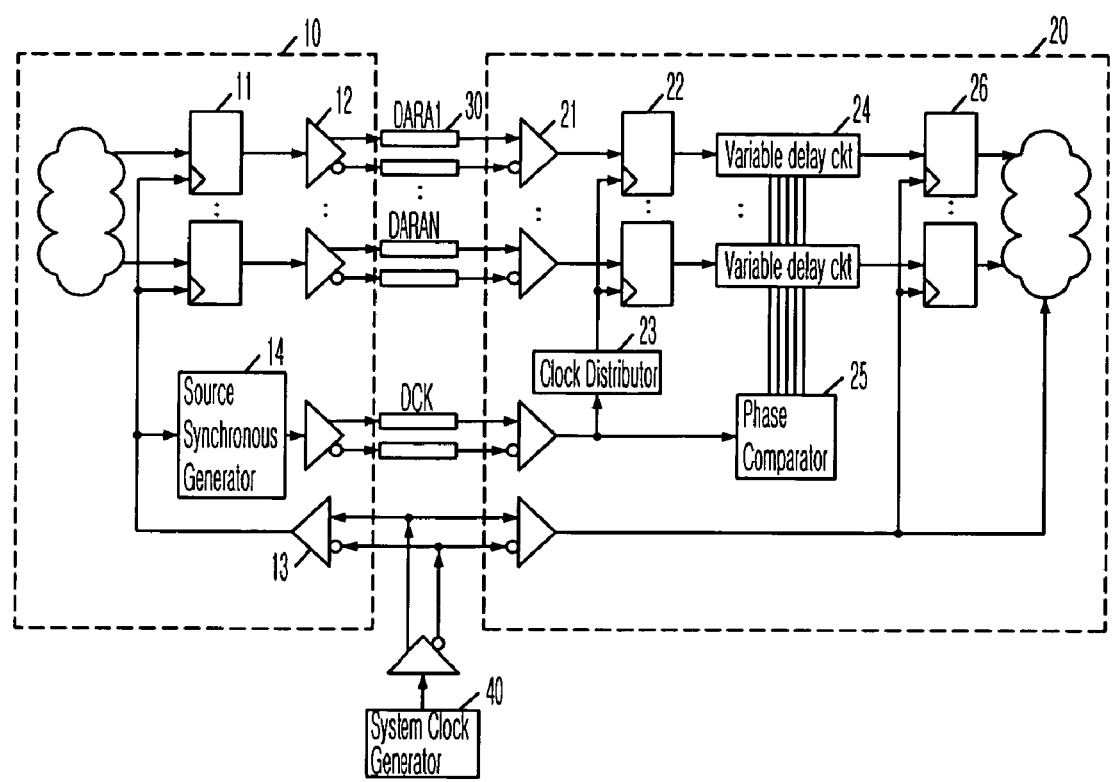
FIG. 1 is a block diagram illustrating a digital system using a source synchronous channel in accordance with the prior art.

The clock synchronizing apparatus according to the second embodiment shown in FIG. 3 can synchronize a clock by using a source synchronous clock inputted through a source synchronous channel as like as the clock synchronizing apparatus according to the first embodiment shown in FIG. 1. Also, constitutional elements of the clock synchronizing apparatus according to the second embodiment perform identical functions to the corresponding constitutional elements of the clock synchronizing apparatus according to the first embodiment excepting the above phase detectors.

Just as that of the first embodiment, the clock synchronizing apparatus according to the second embodiment synchronizes a clock based on the source synchronous clock by selecting a phase difference signal through an internal logic in the phase difference signal selectors 205 and 225, wherein a phase difference signal is calculated through a justification of an internal logic in the system using a system clock.

Figure 4:
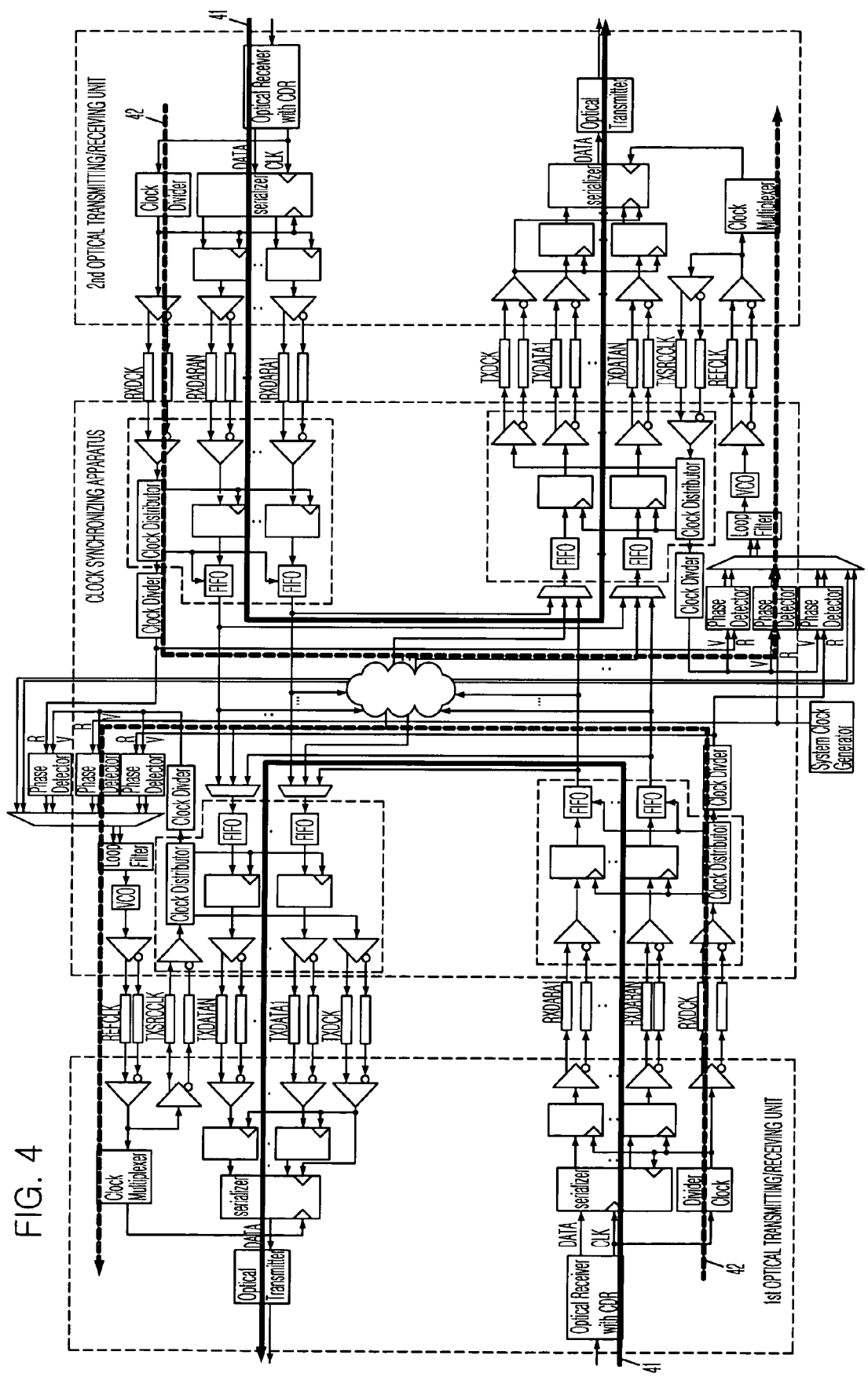
FIG. 4 is a block diagram depicting an apparatus for synchronizing a clock using a source synchronous clock when loop-backing a source synchronous clock in accordance with a preferred embodiment of the present invention.

FIG. 4 is a block diagram depicting an apparatus for synchronizing a clock using a source synchronous clock when loop-backing a source synchronous data in accordance with a preferred embodiment of the present invention.

In FIG. 4, an arrow 41 denotes a loop-back flow of source synchronous data after inputted from an external device. Also, an arrow 42 represents a flow of a synchronous clock signal for loop-back of the source synchronous data.

If an inputted optical signal must be re-transmitted by reshaping, regenerating and retiming (3R) as like as a 3R repeater, the clock synchronizing apparatus may output the inputted source synchronous data through the loop-back.

As shown in FIG. 4, in order to loop back the source synchronous data, the second data path selector 228 selects data received from the first source synchronous channel receiver 201 and the first data path selector 208 selects data received from the second source synchronous channel receiver 221.

In order to synchronize a clock between the first source synchronous channel receiver 201 and the second source synchronous channel transmitter 229, the second reference clock selector 223 selects a source synchronous clock inputted from the first clock divider 202 as a reference clock, and the second phase difference signal selector 225 selects a pulse signal received from the second phase detector 224. The selected pulse signal is transmitted to the second loop filter 226.

In order to synchronize a clock between the second source synchronous channel receiver 221 and the first source synchronous channel transmitter 209, the first reference clock selector 203 selects a source synchronous clock inputted from the second clock divider 222 as a reference clock, and the first phase difference signal selector 205 selects a pulse signal received from the first phase detector 204. The selected pulse signal is transmitted to the first loop filter 206. As described above, the clock synchronizing apparatus according to the present embodiment can be configured as a 1:2 data buffer or 2×2 switch through the clock synchronous selection. Also, the clock synchronizing apparatus according to the present invention can be implemented as an internal signal processing apparatus by synchronizing a clock through an internal logic.

In the internal signal processing apparatus, a data signal of a received source channel can be monitored. Also, an overhead signal can be monitored, modified and inserted. Furthermore, the data signal can be re-generated and outputted as a completely different new formatted signal.

As described above, the clock synchronizing apparatus according to the present invention can loop back data received from a source synchronous channel, or pass the data through other path, by using a received source synchronous clock without using a system clock when the clock synchronizing apparatus according to the present invention is used in a repeater or a wavelength transforming system. When the clock synchronizing apparatus according to the present invention loops back the data, the clock synchronizing apparatus can performs 3R operation, i.e., reshaping, retiming, regenerating, on an input signal. Furthermore, the clock synchronizing apparatus according to the present invention can be used as 2×2 switch or 1:2 buffer by using the look-back and the pass-through. Moreover, the clock synchronizing apparatus according to the present invention can be used to switch data of higher frequency than 10 Gbps.

As described above, the clock synchronizing apparatus can process input source synchronous data signal since the clock synchronizing apparatus can alternatively select independent internal system clock or a phase difference signal generated by embodying a justification function of an internal logic for synchronization. For example, the clock synchronizing apparatus can perform a framer function such as mapping or de-mapping signal.

Since a synchronous clock configuration can be dynamically changed in the clock synchronizing apparatus according to the present invention, the clock synchronizing apparatus can be effectively used for testing a designed internal logic.

The present application contains subject matter related to Korean patent application No. 2004-0107257, filed in the Korean Intellectual Property Office on Dec. 16, 2004, the entire contents of which is incorporated herein by reference.

While the present invention has been described with respect to the particular embodiments, it will be apparent to those skilled in the art that various changes and modifications may be made without departing from the scope of the invention as defined in the following claims.

What is claimed is:

1. An apparatus for synchronizing a clock using a source synchronous clock in an optical transmission system, the apparatus comprising:

a first and a second source synchronous channel receiving means for receiving a source synchronous channel inputted from an external device;

a first and a second clock dividing means for dividing the source synchronous clock received from the first and the second source synchronous channel receiving means to a low frequency clock to be used to synchronize a clock;

a first and a second reference clock selecting means for selecting one of the divided source synchronous clock from the first clock dividing means, the divided source synchronous clock from the second clock dividing means and a system clock as a reference clock;

a first and a second phase detecting means for receiving the reference clock from the first and the second reference clock selecting means, receiving a supplementary clock from a third and a fourth clock dividing means, wherein the supplementary clock is generated at the third and the fourth clock dividing means by receiving a returned clock (TXSRCCLK) received from an external optical transmission system and dividing the returned clock, comparing the reference clock and the supplementary clock, and generating a phase difference signal according to the comparison result;

a first and a second phase difference signal selecting means for selecting a phase difference signal from the first and the second phase detecting means and a phase difference signal generated by comparing a phase in an internal logic; and a first and a second voltage oscillating means for generating a predetermined synchronous frequency according to the selected phase difference signal, and transmitting a clock synchronized to a source synchronous channel to the external optical transmission system.

2. The apparatus as recited in claim 1, further comprising:

a first and a second data path selecting means for selecting synchronous channel data received from the first and the second source synchronous channel receiving means and data received from other internal logic circuit, and externally outputting the selected data through the first and the second synchronous channel transmitting means in order to loop back source synchronous data inputted from an external device.

3. The apparatus as recited in claim 2, further comprising:

a first and a second loop filtering means for changing a voltage of the first and the second voltage oscillating means by eliminating noises of a phase difference signal outputted from the first and the second phase difference signal selecting means.

4. An apparatus for synchronizing a clock using a source synchronous clock in an optical transmission system, the apparatus comprising:

a first and a second source synchronous channel receiving means for receiving a source synchronous channel inputted from an external device;

a first and a second clock dividing means for dividing the source synchronous clock received from the first and the second source synchronous channel receiving means to a low frequency clock to be used to synchronize a clock;

a phase detecting means having a plurality of phase detectors for generating a phase difference signal by comparing each of two source synchronous clocks received from the first and the second clock dividing means to a system clock;

a first and a second phase difference signal selecting means for selecting a phase difference signal from each of the phase detectors and a phase difference signal generated by comparing a phase in an internal logic; and a first and a second voltage oscillating means for transmitting a clock synchronized to a source synchronous channel to the external optical transmission system by generating a predetermined synchronous frequency according to the selected phase difference signal.

5. The apparatus as recited in claim 2, wherein the phase detecting means includes:
- a second and a fifth phase detector for generating a phase difference signal by comparing a source synchronous clock (RXDCK) received from the second clock dividing means and a variable clock (TXSRCLK);
- a first and a fourth phase detector for generating a phase difference signal by comparing a system clock as a reference clock to the variable clock (TXSRCLK); and
- a third and a sixth phase detector for generating a phase difference signal by comparing a source synchronous clock received from the first clock dividing means to the variable clock.

6. The apparatus as recited in claim 4, further comprising:
- a first and a second data path selecting means for selecting synchronous channel data received from the first and the second source synchronous channel receiving means and data received from other internal logic circuit, and externally outputting the selected data through the first and the second synchronous channel transmitting means in order to loop back source synchronous data inputted from an external device.

7. The apparatus as recited in claim 6, further comprising:
- a first and a second loop filtering means for changing a voltage of the first and the second voltage oscillating means by eliminating noises of a phase difference signal outputted from the first and the second phase difference signal selecting means.

* * * * *